United States Patent [19]

Komori

[11] Patent Number: 4,792,867

[45] Date of Patent: Dec. 20, 1988

[54] SYNCHRONIZING CIRCUIT FOR DUBBING APPARATUS

[75] Inventor: Yuji Komori, Yokohama, Japan

[73] Assignee: Kabushiki Kaisha Toshiba, Kanagawa, Japan

[21] Appl. No.: 907,968

[22] Filed: Sep. 16, 1986

[30] Foreign Application Priority Data

Sep. 20, 1985 [JP] Japan .................................. 60-207904

[51] Int. Cl.$^4$ ................................................ G11B 5/86
[52] U.S. Cl. .......................................... 360/13; 360/15
[58] Field of Search ....................... 360/13, 15, 61, 137

[56] References Cited

U.S. PATENT DOCUMENTS 3,594,513  7/1971  Greenberg et al. .................... 360/13
3,789,159  1/1974  Feit et al. .............................. 360/13

OTHER PUBLICATIONS

Japanese Examined Utility Model Application: Jikko Sho 60-25706, published on Aug. 2, 1985.

Primary Examiner—Raymond F. Cardillo
Assistant Examiner—Kevin J. Fournier
Attorney, Agent, or Firm—Finnegan, Henderson, Farabow, Garrett & Dunner

[57] ABSTRACT

A synchronizing circuit for a dubbing apparatus which is capable of a dubbing a signal played back from a playback unit to a recording unit in accordance with the operation of a dubbing command key. The synchronizing circuit essentially includes a power source for supplying a driving current, a potential source associated with the dubbing command key for supplying a prescribed potential, first and second devices for setting the playback unit and the recording unit in a playback mode and a recording mode, respectively, first and second circuits for activating the first and second setting device by applying the driving current in response to the reception of the prescribed potential, respectively, and a circuit for delaying the supply of the prescribed potential to one of the first and second activating circuits when the prescribed potential is first applied to the other activating circuit.

4 Claims, 2 Drawing Sheets 4,792,867

SYNCHRONIZING CIRCUIT FOR DUBBING APPARATUS

BACKGROUND OF THE INVENTION

1. Field of the invention

The present invention relates generally to a dubbing apparatus, and more particularly to a synchronizing circuit for a playback unit and a recording unit in a dubbing apparatus.

2. Description of the prior art

As well known, cassette tapes have merits of being compact in size and easy to handle, compared to conventional so-called open tapes. Due to the compactness and the handiness of the cassette tapes, cassette tape recorders have been popular for a long time in the audio field and a variety of functions have been recently developed for such equipment. For example, double cassette tape recorders, i.e., combination apparatus of two cassette tape drive mechanisms in a single body (hereafter referred to as double cassette tape recorders) are widely used in the portable equipment field. The double cassette tape recorders are convenient for dubbing from a recorded tape on one tape drive mechanism in the playback (PLAY) mode to an unrecorded tape on the other tape drive mechanism in the recording (REC) mode.

In addition, tape recorders have been developed which have their various operation modes logically controlled by microprocessors. In the tape recorders, so-called logic-control type tape recorders, operation keys for manually commanding the various operation modes are constructed to electrical soft-touch switches. Then, when any operation key of the soft-touch switch is depressed by an operator, the microprocessor activates a solenoid plunger in the tape recorder in response to the depression of the key. Then the solenoid plunger drives a playback magnetic head, and a pinchroller to their driving positions. Or the solenoid plunger drives the tape drive mechanism of the tape recorder so that a cassette tape is driven in the PLAY mode, the REC mode, a fast forward (FF) mode or a fast rewind (REW) mode. Therefore, the logic-control type tape recorders are easy to operate and simple in mechanism. The logic-control system has also been adopted to double cassette tape recorders, since the logic control system is especially suited for performing various complicated functions of the double cassette tape recorders and also for simplifying their complicated mechanisms. In the double cassette tape recorders of the logic-control type, dubbing is also performed by simply depressing a single key mounted on the front panel of the double cassette tape recorder.

The logic-control system consumes a tolerable large amount of power, because the solenoid plunger requires a large current to drive the tape drive mechanism. In addition, in conventional double cassette tape recorders, the tape drive mechanisms are simultaneously operated into the PLAY mode and the REC mode for dubbing. Therefore, a tolerable large amount of current flows for activating at least two solenoid plungers at the start of dubbing, but in other times, e.g., during a steady state of dubbing, during the PLAY mode etc., a relatively small current flows for driving the tape drive motors. Therefore, the conventional double cassette tape recorders of a battery driven portable type (hereafter referred to simply as portable double cassette tape recorders) must be equipped with a battery of a large power capacity, which may supply sufficient currents for the solenoid plungers of the respective tape drive mechanisms, at the start of dubbing. Therefore, it has been desired to reduce the amount of current required by the double cassette tape recorders, at the start of dubbing.

SUMMARY OF THE INVENTION

An object of the present invention is to provide a synchronizing circuit for dubbing apparatus which is able to reduce power consumed for driving the apparatus.

Another object of the present invention is to provide a synchronizing circuit for dubbing apparatus which is able to reduce current required for driving the apparatus.

A further object of the present invention is to provide a synchronizing circuit for a dubbing apparatus which is able to utilize a battery of reduced capacity for driving the apparatus.

A still further object of the present invention is to provide a synchronizing circuit for a dubbing apparatus which is able to reduce a capacity of a battery for driving the apparatus.

A still further object of the present invention is to provide a synchronizing circuit for a dubbing apparatus which is suitable for a battery driven portable apparatus.

These and other objects are achieved in the synchronizing circuit of the present invention which essentially includes a power source for supplying a driving current, a potential source associated with the dubbing command key for supplying a prescribed potential, first and second devices for setting the playback unit and the recording unit in a playback mode and a recording mode, respectively, first and second circuits for activating the first and second setting device by applying the driving current in response to the reception of the prescribed potential, respectively, and a circuit for delaying the supply of the prescribed potential to any one of the first and second activating circuits from the other activating circuit.

Additional objects, advantages and features of the present invention will further become apparent to persons skilled in the art from a study of following description and of the accompanying drawings.

DESCRIPTION OF THE PREFERRED EMBODIMENTS

Figure 1:
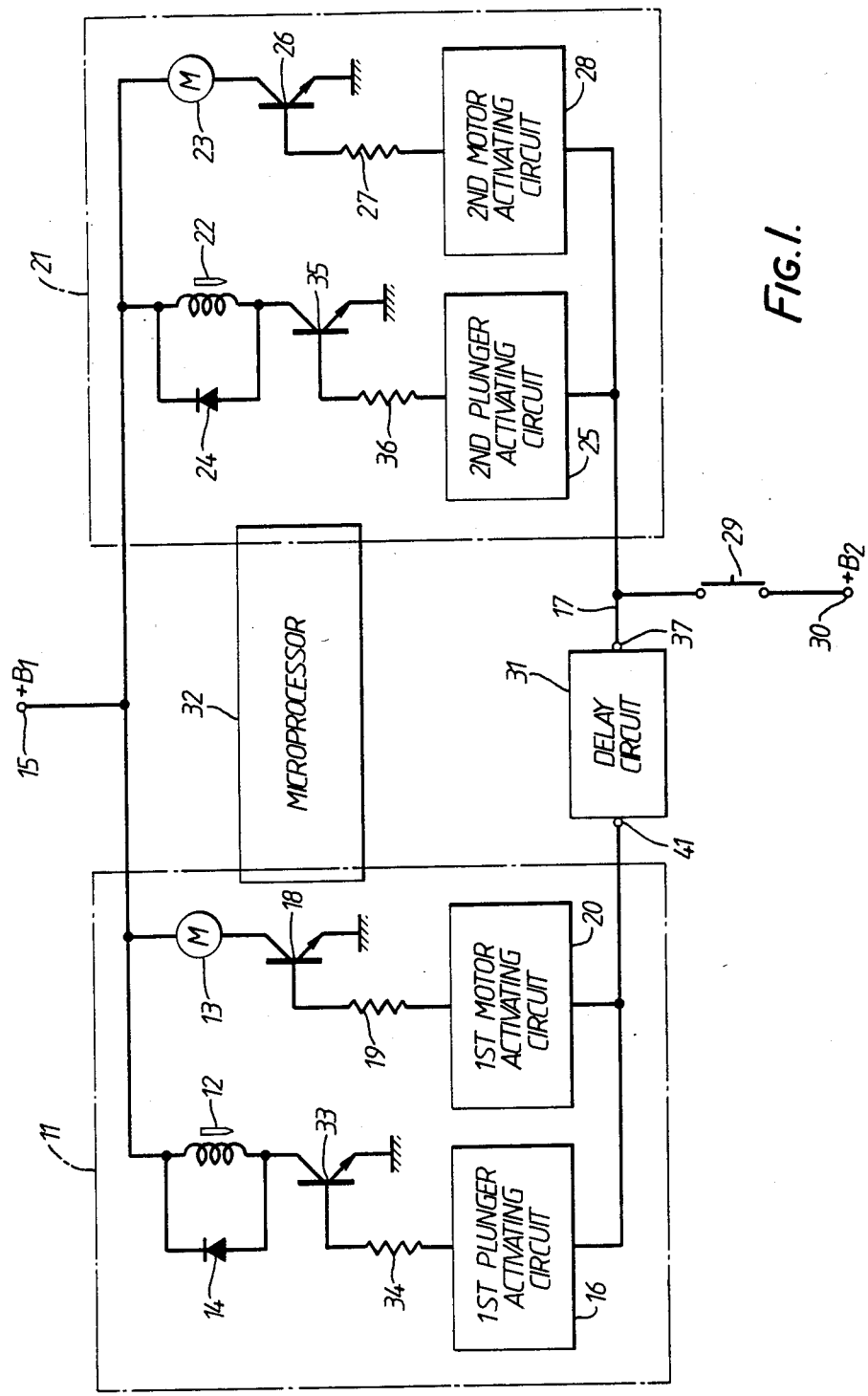
FIG. 1 is a circuit diagram of an embodiment of a synchronizing circuit for a dubbing apparatus according to the present invention.

The present invention will now be described in detail with reference to the accompanying drawings, namely, Figures 1 to 4. Throughout the drawings, like reference numerals and letters are used to designate like or equivalent elements for the sake of simplicity of explanation.

An embodiment of the present invention will now be described in detail with reference to FIG. 1. FIG. 1 shows a partial circuit diagram of a double cassette tape recorder, i.e., a combination apparatus including two cassette tape recorder units in a single body. In FIG. 1, reference numeral 11 designates a part of a first control circuit for controlling one of the cassette tape recorder units, e.g., a tape playback unit (not shown). Reference numeral 21 designates a part of a second control circuit for controlling the other of the cassette tape recorder units, e.g., a tape recording unit (not shown). These first and second control circuits 11 and 21 may be controlled together by a single microprocessor 32 which is responsive to manual command keys (not shown), or separately by individual microprocessors for each control circuit.

The first control circuit 11 has a first solenoid plunger 12 for triggering a tape drive mechanism of the playback unit into a prescribed state to start the PLAY mode. The first solenoid plunger 12 is connected between a power source 15 and a first switching transistor 33. The first switching transistor 33 is connected at the collector to the first solenoid plunger 12 and at the emitter to a ground terminal. The base of the first switching transistor 33 is connected to an output terminal of a first plunger activating circuit 16 through a resistor 34. The power source 15 supplies a first drive voltage +B1. In addition, a first diode 14 is connected in parallel with the first solenoid plunger 12 in the bias direction opposite to the polarity of the power source 15 so that the first diode 14 bypasses a counter electromotive force generated in the first solenoid plunger 12. The first plunger activating circuit 16 is connected at its input terminal to a potential source 30 through a delay circuit 31 and a switch 29 which is associated with a dubbing command key (DUBBING key) (not shown).

The first control circuit 11 also has a first motor 13 for driving a tape drive mechanism of the playback unit into a prescribed state of the PLAY mode after the tape drive mechanism of the playback unit has been triggered to start the PLAY mode by the first solenoid plunger 12. The first motor 13 is connected between the power source 15 and a second switching transistor 18. The second switching transistor 18 is connected at the collector to the first motor 13 and at the emitter to the ground terminal. The base of the second switching transistor 18 is connected to a first motor activating circuit 20 through a resistor 19. The first plunger activating circuit 16 and the first motor activating circuit 20 bias the first switching transistor 33 and the second switching transistor 18 to activate when a potential +B2 of the potential source 30 is applied thereto. Then, the first solenoid plunger 12 drives the tape drive mechanism of the playback unit into the PLAY mode. At the same time, the first motor 13 starts driving a cassette tape which is loaded on the playback unit.

The second control circuit 21 has a second solenoid plunger 22 for triggering a tape drive mechanism in the recording unit into a prescribed state to start the REC mode. The second solenoid plunger 22 is connected between the power source 15 and a third switching transistor 35. The third switching transistor 35 is connected at the collector to the second solenoid plunger 22 and at the emitter to the ground terminal. The base of the third switching transistor 35 is connected to an output terminal of a second plunger activating circuit 25 through a resistor 36. In addition, a second diode 24 is connected in parallel with the second solenoid plunger 22 in the bias direction similarly to the first diode 14. The second plunger activating circuit 25 is connected at its input terminal to the potential source 30 through switch 29. The second control circuit 21 also has a second motor 23 for driving the tape drive mechanism of the recording unit into a prescribed state of the REC mode after the tape drive mechanism of the recording unit has been triggered to start the REC mode by the second solenoid plunger 22. The second motor 23 is connected between the power source 15 and a fourth switching transistor 26. The fourth switching transistor 26 is connected at the collector to the second motor 23 and at the emitter to the ground terminal. The base of the fourth switching transistor 26 is connected to a second motor activating circuit 28 through a resistor 27. The second plunger activating circuit 25 and the second motor activating circuit 28 bias the third switching transistor 35 and the fourth switching transistor 26, respectively, to activate when the potential +B2 of the potential source 30 is applied thereto. Then, the second solenoid plunger 2 drives the tape drive mechanism of the recording unit into the REC mode. At the same time, the second motor 23 starts driving another cassette tape which is loaded on the recording unit.

The potential source 30 supplies the potential +B2 to the first control circuit 11 and the second control circuit 21, respectively, when the switch 29 is activated. The switch 29 is activated by the microprocessor 32 in response to the operation, e.g., a one-touch operation of the DUBBING key. The potential +B2 of the potential source 30 is, however, applied directly to the second control circuit 21 while the potential +B2 is applied to the first control circuit 11 through the delay circuit 31 with a predetermined delay time. The delay circuit 31 is actually composed in the microprocessor 32 as a form of software, but it is able to be represented by an equivalent hardware circuit as shown in FIG. 2.

Figure 2:
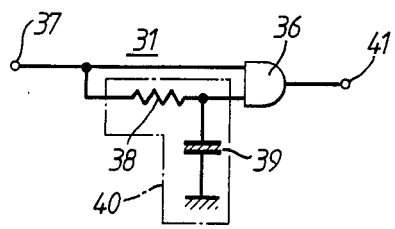
FIG. 2 is circuit diagram showing a detail of the delay circuit of FIG. 1.

In FIG. 2, an AND gate 36 is connected at its first input terminal directly to an input terminal 37 which is to be connected to the switch 29 (see FIG. 1). The second input terminal is connected to the input terminal 37 through a resistor 38. In addition the second input terminal is grounded through a capacitor 39. The resistor 38 and the capacitor 39, therefore, comprise a time constant circuit 40. An output terminal 41 of the AND gate 36 is connected to the first control circuit 11 (see FIG. 1).

Figure 3:
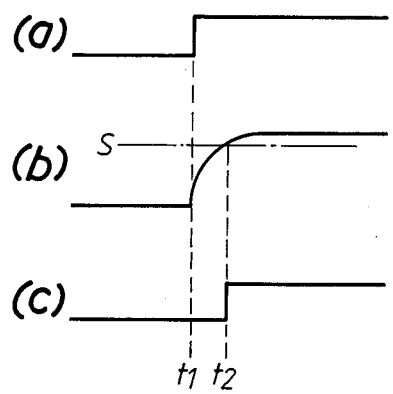
FIGS. 3, (a)–(c), is a timing chart for illustrating the operation of the delay circuit shown in FIG. 2.
Figure 4:
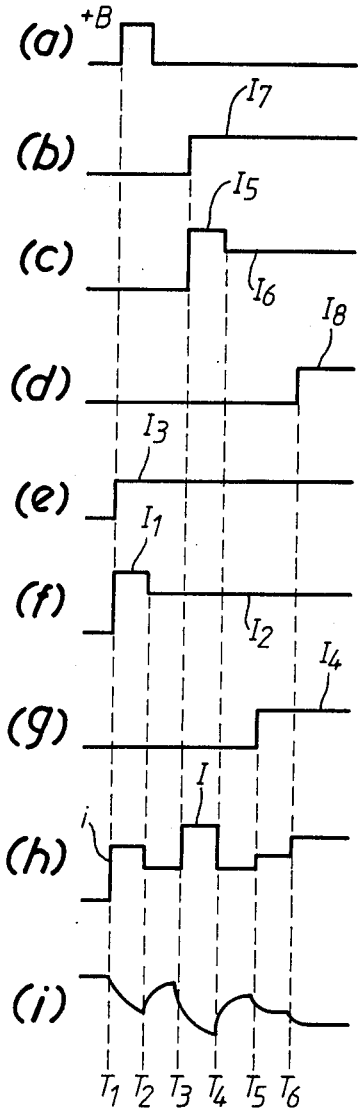
FIGS. 4, (a)–(i), is a timing chart for illustrating the operation of the synchronizing circuit shown in FIG. 1.

Referring now to FIGS. 3 and 4, an operation of the above embodiment will be described in detail. First, an operation of the delay circuit 31 as shown in FIG. 2 will be described in reference to the time charts in FIG. 3. When a high (H) level potential as shown in Graph (a), i.e., the potential +B2 of the potential source 30, is applied to the microprocessor 32 at time t1, the H level potential is directly applied to the first input terminal of the AND gate 36. The H level potential is applied in association with the activation of the switch 29 (see FIG. 1). In addition, the H level potential is applied to the second input terminal of the AND gate 36 through the time constant circuit 40. Therefore, a potential on the second input terminal of the AND gate 36 increases gradually as shown in Graph (b). When the potential on the second input terminal of the AND gate 36 exceeds a prescribed threshold level S at a time t2, the potential on the output terminal 41 of the AND gate 36 turns to H level as shown in Graph (c). In other words, the potential on the output terminal 41 of the AND gate 36 turns to the H level after a delay time between times t1 and t2 from the activation of the switch 29. The H level potential on the output terminal 41 of the AND gate 36 is applied to the input terminal of the first plunger activating circuit 16 and the first motor activating circuit 20 in the first control circuit 11.

Next, operations of the first control circuit 11 and the second control circuit 21 will be described in reference to time charts of FIG. 4. When the switch 29 is activated at the time t1, an H level pulse as shown in Graph (a) appears on a line 17, which is connected to both the second control circuit 21 and the first control circuit 11 directly and undirectly. In response to the H level pulse on the line 17, the second plunger activating circuit 25 and the second motor activating circuit 28 in the second control circuit 21 activate the third switching transistor 35 and the fourth switching transistor 26, respectively, where it is assumed that the microprocessor 32 keeps the drive circuits, i.e., the second plunger activating circuit 25, the second motor activating circuit 28, the first plunger activating circuit 16 and the first motor activating circuit 20, in the activated states in response to a one-shot pulse like the H level pulse. Then, the second solenoid plunger 22 and the second motor 23 are activated at a time T1, which corresponds to the time t1 in FIG. 3.

At the beginning of the activation of the second solenoid plunger 22, a relatively large current I1 flows through the second solenoid plunger 22 as shown in Graph (f). After the second solenoid plunger 22 has triggered the tape drive mechanism of the recording unit in the prescribed state for starting the REC mode at a time T2, the second solenoid plunger 22 is maintained in the activated condition by a small current I2 as also shown in Graph (f). At the time T1, the second motor 23 drives the tape drive mechanism of the recording unit, which has been triggered in the prescribed state for starting the REC mode by the second solenoid plunger 22, into the REC mode state so that a current I3 as shown in Graph (e) flows through the second motor 23. After the tape drive mechanism of the recording unit has completely entered into the REC mode, a tape drive motor (not shown), in the tape drive mechanism of the recording unit, is activated at a time T5 as shown in Graph (g). Then, a current I4 flows through the reel motor in the tape drive mechanism of the recording unit.

The H level pulse on the line 17 is transmitted to the first control circuit 11 at a time T3, which corresponds to the time t2 of FIG. 3, in accordance with the delay time of the delay circuit 31. In response to the H level pulse, the first plunger activating circuit 16 and the first motor activating circuit 20 in the first control circuit 11 activate the first switching transistor 33 and the second switching transistor 18, respectively. Then, the first solenoid plunger 12 and the first motor 13 are activated at the time T3. At the beginning of the activation of the first solenoid plunger 12, a relatively large current I5 as shown in Graph (c), which is almost equal to the current I1, flows through the first solenoid plunger 12. After the first solenoid plunger 12 has triggered the tape drive mechanism of the playback unit in the prescribed state for starting the PLAY mode at a time T4, the second solenoid plunger 22 is maintained in the activated condition by a small current I6 as also shown in Graph (c), which is almost equal to the current I2. At the time T3, the first motor 13 drives the tape drive mechanism of the playback unit, which has been triggered in the prescribed state for starting the PLAY mode by the first solenoid plunger 12, into the PLAY mode state so that, a current I7 as shown in Graph (b), which is almost same to the current I3, flows through the first motor 13. After the tape drive mechanism of the playback unit has completely entered into the PLAY mode, a tape drive motor (not shown) in the tape drive mechanism of the playback unit is activated at a time T6 as shown in Graph (d). Then, a current I8 flows through the reel drive motor in the tape drive mechanism of the playback unit.

According to the above embodiment, a total current i supplied from the power source 15 varies as shown in Graph (h) of FIG. 4. The total current i has a maximum current value I, which is a sum of the currents I2, I3, I5 and I7, at a period from T3 to T4. However, the maximum current value I is limited to a value sufficiently smaller than a sum of the currents I1, I3, I5 and I7, which would be flow if the first solenoid plunger 12 and the first motor 13 in the first control circuit 11 were activated simultaneously with the second solenoid plunger 22 and the second motor 23 in second control circuit 21.

In addition, a Graph (i) in FIG. 4 shows a variation of the voltage +B1 of the power source 15. As shown in Graph (i), the voltage +B1 of the power source 15 decreases in accordance with the variation of the current i. The maximum voltage drop of the voltage +B1 occurrs in the period from T3 to T4. However, the maximum voltage drop is also limited to a value sufficiently smaller than a voltage drop, which would occur if the first solenoid plunger 12 and the first motor 13 in the first control circuit 11 were activated simultaneously with the second solenoid plunger 22 and the second motor 23 in the second control circuit 21.

Accordingly, the power source 15 of a relatively small capacity can be used for the dubbing apparatus. The effect of suppressing the voltage drop of the power source 15 is particularly useful for a battery driven apparatus.

In addition, the tape drive mechanism of the playback unit is activated in the PLAY mode well after the tape drive mechanism of the recording unit has been activated in the REC mode, according to the present invention. Therefore, the invention prevents a leading portion of a signal played back in the tape playback unit from failing to be recorded during the tape recording unit in dubbing.

As described above, the present invention makes it possible to provide a superior synchronizing circuit for a dubbing apparatus.

What is claimed is:

1. A synchronizing circuit for a dubbing apparatus comprising:

a single dubbing command key, said dubbing apparatus being responsive to manual activation of said single dubbing command key and being capable of dubbing a playback signal played back from a playback unit to a recording unit;

a power source for supplying a driving current;

a potential source associated with the single dubbing command key for supplying a prescribed potential;

first setting means for setting the playback unit in a playback mode, said first setting means including a first triggering means for triggering the playback unit into a prescribed state to start the playback mode, said triggering occurring in response to activation by a first switching transistor, and a first driving means for driving the playback unit during the playback mode after the playback unit is triggered by the first triggering means, said first driving means being activated by a second switching transistor;

first activating means, including a first plunger activating circuit and a first motor activating circuit, said first switching transistor being biased to activate by said first plunger activating circuit, for activating the first setting means, the first activating means applying the driving current from the power source to the first setting means in response to the prescribed potential applied from the potential source;

second setting means for setting the recording unit in a recording mode, said second setting means including a second triggering means for triggering the recording unit into a prescribed state to start the recording mode, said triggering occurring in response to activation by a third switching transistor, and a second driving means for driving the recording unit during the recording mode after the recording unit is triggered by the second triggering means, said second driving means being activated by a fourth switching transistor;

second activating means, including a second plunger activating circuit and a second motor activating circuit, said third switching transistor being biased to activate by said second plunger activating circuit and said fourth switching transistor being biased to activate by said second motor activating circuit, for activating the second setting means, the second activating means applying the driving current from the power source to the second setting means in response to the prescribed potential applied from the potential source; and means for delaying the supply of the prescribed potential to one of the first and second activating means when the prescribed potential is first applied to the other of the activating means.

2. The synchronizing circuit of claim 1, wherein the delaying means delays the supply of the prescribed potential to the first activating means when the second activating means is first activated.

3. The synchronizing circuit of claim 2, wherein the first and second triggering means are solenoid plungers, and wherein the first and second driving means are electric motors.

4. The synchronizing circuit of claim 1, wherein the first and second activating means and the delaying means are comprised of a microcomputer.

* * * * *